United States Patent [19]
Wakamatsu et al.

[11] 3,724,295
[45] Apr. 3, 1973

[54] AUTOMATIC TRANSMISSION CONTROL SYSTEM FOR AUTOMOTIVE TRANSMISSION OF VEHICLES

[75] Inventors: Hisato Wakamatsu, Kariya; Akira Kitano, Nagoya; Hisasi Kawai, Toyohashi, all of Japan

[73] Assignee: Nippondenso Kabushiki Kaisha, Kariya-shi, Aichi-ken, Japan

[22] Filed: Aug. 3, 1970

[21] Appl. No.: 60,279

Related U.S. Application Data

[63] Continuation-in-part of Ser. No. 34,098, May 4, 1970.

[30] Foreign Application Priority Data

Aug. 21, 1969 Japan..................................44/66378

[52] U.S. Cl..........................................74/866, 74/752
[51] Int. Cl..........................B60k 21/00, F16h 57/10
[58] Field of Search...........................................74/866

[56] References Cited

UNITED STATES PATENTS 3,439,564   4/1969   Scholl et al.............................74/866
3,448,640   6/1969   Nelson....................................74/866

*Primary Examiner*—Arthur T. McKeon
*Attorney*—Cushman, Darby & Cushman

[57] ABSTRACT

An automatic transmission control system for automobiles, which comprises a vehicle speed detector to produce an output signal at a frequency proportional to the vehicles speed, a D-A converter to produce an analog signal from the output signal from the vehicle speed detector, an engine load detector to produce an output signal corresponding to the engine load, a gear-shift signal generator circuit to generate a gear-shift signal by detecting a gear-shift point from the output signals from the vehicle's speed and engine-load detectors, a memory receiving the gear-shift signal, and an accident detector to produce an output signal if the voltage level of the output signal of the vehicle speed detector suddenly drops, wherein the output of the memory is normally changed in accordance with the gear-shift signal to shift the position of the gear-shifting mechanism of the transmission, but is it held unchanged irrespective of change of the gear shift signal if the engine throttle valve is closed, and it is also held unchanged if the output signal of the accident detector is present.

6 Claims, 11 Drawing Figures

AUTOMATIC TRANSMISSION CONTROL SYSTEM FOR AUTOMOTIVE TRANSMISSION OF VEHICLES

This application is a continuation-in-part of our commonly assigned copending application ser. No. 34,098, filed May 4, 1970, and is related to our copending commonly assigned applications ser. no. 35,327, filed May 7, 1970, now U.S. pat. no. 3,662,625; ser. No. 53,909, filed July 10, 1970; and ser. No. 58,080, filed July 24, 1970.

This invention relates to automatic transmission control systems for automatically controlling the gear-shifting of the transmission gears in accordance with the vehicle speed and engine load of travelling vehicles.

The usual automatic transmission control system adopted in automatic transmissions for vehicles, for instance the one employed in the four-forward-position automatic transmission on buses, has a gear-shift signal generator to produce a gear-shift signal on the basis of an electric signal corresponding to the speed of the vehicle, which is produced by a DC generator, and another electric signal corresponding to the position of the throttle of the engine mounted on the vehicle or the position of the depressed accelerator, which is produced by a throttle switch, that is, on the basis of the vehicle speed and engine load, in accordance with a given gear-shifting characteristic (predetermined shifting points). The gear shift signal is registered on a holding circuit (to be described hereinafter) to cause an electromagnetic valve drive consisting of relays to bring a specified one of the first to fourth speed gears of the gear-shifting mechanism into mesh with an engine side gear through a fluid coupling means, usually referred to as hydraulic torque converter, thereby achieving the intended gear shifting.

The output terminal of the afore-mentioned vehicle speed detection DC generator is also connected to a sudden deceleration detector, which generates an output signal when the voltage of the output of the DC generator is reduced to nearly zero as a result of the sudden deceleration of the vehicle or when the output voltage of the DC generator becomes zero due to an accident such as breaking and short-circuit of leads within and leading to and from the DC generator, short-circuit of the output terminal of the DC generator and so forth. When the output signal of the sudden deceleration detector is generated, the afore-said relay means is actuated, thereby retaining the previous gear position of the gear shifting mechanism unshifted. Thus, various undesired results such as, for instance, accidental downshifting from the fourth into the first speed gear, which would otherwise occur if the output of the DC generator happens to be short-circuited, may be prevented. However, if the response of the gear-shift signal generator to the DC generator output is faster than the response of the sudden deceleration detector, the sudden deceleration detector would generate an output signal only after the generation of a gear-shift signal from the gear-shift signal generator for automatically shifting into a lower-speed gear in case the output voltage of the DC generator is reduced to zero due to, for instance, the accidental short-circuiting of the output terminal of the DC generator. In such an operation, the relay means will be actuated in vain in response to the output signal of the DC generator after the downshifting of the gear-shifting mechanism will have already been executed by the output signal from the gear-shift signal generator. To obviate the above inconvenience, the response of the gear-shift signal generator should be slower than the response of the sudden deceleration detector.

With the above conventional system, however, it is extremely difficult technically to adjust the response characteristics of the gear-shift signal generator consisting of relays and the sudden deceleration detector also consisting of relays with respect to each other so as to meet the above discussed demand. This disadvantageously resists the reduction of manufacturing cost and mass production. Besides, the plurality of relays involved to construct the gear-shift signal generator and the sudden deceleration detector inevitably leads to increased weight and volume, and hence increased cost, of the vehicle speed detection DC generator. In case of using a small-size light-weight AC generator in place of the above DC generator for detecting the vehicle speed, it is technically impossible to drive the relays directly using the AC output from the AC generator.

A further inconvenience is encountered when applying the engine brake. As the engine brake is applied the actual vehicle's speed suddenly reduces, so that if the vehicle is running with the transmission placed in the fourth, for instance, there is no trouble in downshifting into the second or first speed gear upon sudden application of the brake. Rather, such downshifting enables attaining the subsequent acceleration extremely smoothly. However, with the above system the sudden deceleration detector produces an output signal upon sudden application of the engine brake, so that the relay means will hold the gear-shifting mechanism in the previous gear position. Therefore, for the subsequent acceleration the gear-shifting mechanism thus held should be manually released to shift into a lower-speed position, which is very troublesome and disadvantageous curtails the merit of the automatic transmission.

An object of the invention is to overcome the above drawbacks by the provision of an automatic transmission control system for use in automatic transmissions on vehicles, which enables using a small-size, light-weight and inexpensive AC generator or pulse generator as the vehicle speed detector for detecting the vehicle speed in terms of the frequency of an electric signal produced thereby proportional to the vehicle speed.

Another object of the invention is to provide an automatic transmission control system for use in automatic transmission on vehicles, which further comprises a D-A converter to provide an analog signal by the conversion of a digital output signal of the afore-said vehicle speed detector, said analog signal being subjected to a time delay through a relay element, an engine load detector to produce an electric signal corresponding to the throttle opening of the engine throttle or the engine intake negative pressure, a gear-shift signal generator to send out a gear-shift signal by detecting a gear-shifting point from the output signals of both the D-A converter and the engine load detector, a memory, which is adopted to normally provide its output corresponding to the output of the gear-shift signal generator and maintain its output of the gear-shift signal generator and maintain its output corresponding to the previous output of the gear-shift generator immediately before the appearance of a "cut-off" signal indicating the "cut-off" state of the engine throttle valve in case such "cut-off" signal appears from the engine load detector, and a means to execute the shifting of the gear-shifting mechanism of the transmission in accordance with the output signal of the memory, thereby permitting automatic gear-shifting in dependence upon the vehicle speed and the engine load and applying the engine brake at any speed-gear position of the transmission.

A further object of the invention is to provide an automatic transmission control system for use in automatic transmissions on vehicles, which still further comprises an accident detector to produce an output signal when the output signal of the vehicle speed detector disappears and at the same time the output voltage of the D-A converter is above a predetermined value, thereby permitting to hold the transmission gear previously in mesh when the output from the vehicle speed detector ceases due to an accident.

According to the invention, the impression of the output signal of the accident detector on the memory prior to the impression of the output signal of the gear-shift signal detector thereon is achieved by merely introducing a time delay to the output of the vehicle speed detector through a delay element of the D-A converter. Thus, the system according to the invention is very simple and free from the troublesome adjustment of the response characteristics as is required for the conventional system.

The above and other objects, features and advantages will become more apparent from the following detailed description, reference being had to the accompanying drawings, in which.

Figure 1:
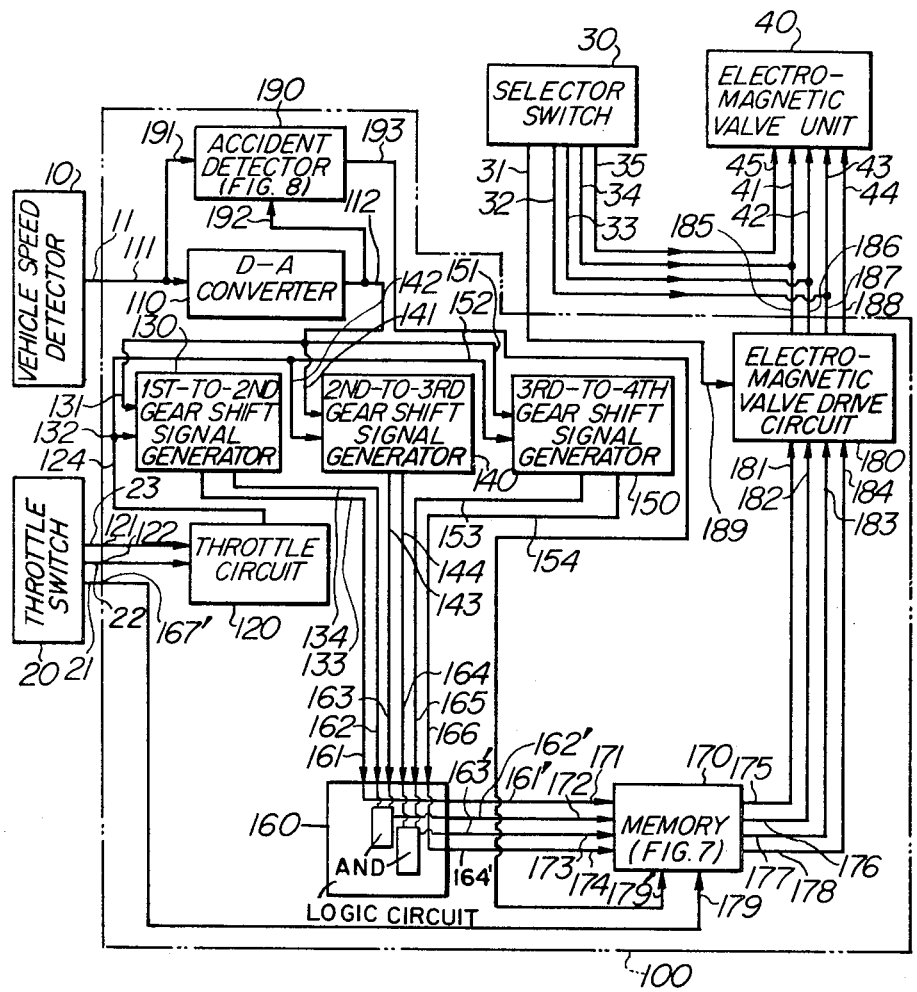
FIG. 1 is a block diagram of a preferred embodiment of the automatic transmission control system for use in automatic transmissions on vehicles according to the invention.

A preferred embodiment of the automatic transmission control system for use in automatic transmissions on vehicles is shown in block form in FIG. 1 in which many of the blocks and details of which are like those shown and described in our copending applications.

Figure 11:
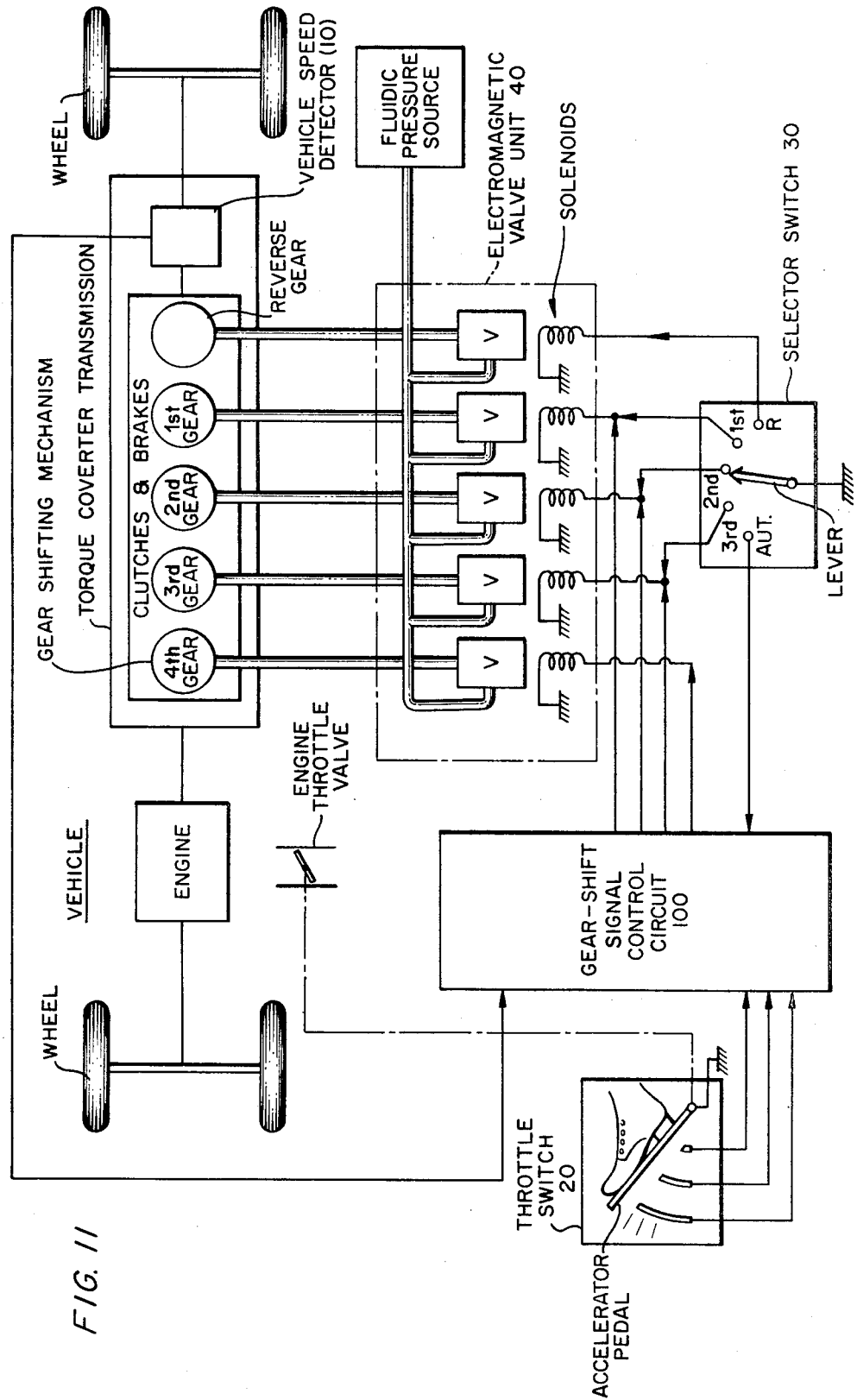
FIG. 11 is a diagramatic general layout of the whole vehicular system.

Referring to the Figure, numeral 10 designates a vehicle speed detector consisting of an AC generator (for example, the tachometer generator 10 in our aforesaid prior application Ser. No. 34,098, or in our aforesaid U.S. Pat. No. 3,662,625, or generator 11 in Wakamatsu et al. U.S. Pat. No. 3,507,544) to produce an electric signal corresponding to the vehicle speed, numeral 20 a throttle switch, numeral 30 a selecter switch, and numeral 40 an electro-magnetic valve unit. FIG. 11 shows the general vehicular layout of the foregoing with a gear shift signal control circuit 100 detailed in FIG. 1 as comprising a D-A (digital-analog) converter 110, a throttle circuit 120, a first-to-second gear-shift signal generator 130 to generate a gear-shift signal for the gear-shifting from the first into the second speed gear, a second-to-third gear-shift signal generator 140 to generate a gear-shift signal for the gear-shifting from the second into the third speed gear, a third-to-fourth gear-shift signal generator 150 to generate a gear-shift signal for the gear-shifting from the third into the fourth speed gear, a logic circuit 160, a memory 170, an electromagnetic valve drive 180 and an accident detector 190. The vehicle speed detector 10 has its output terminal 11 connected to both an input terminal of the D-A converter 110 and an input terminal 191 of the accident detector 190. The throttle switch 20 has output terminals 21, 22 and 23, one of which, namely output terminal 21, is connected to an input terminal 179 of the memory 170, while the other output terminals 22 and 23 are connected to respective input terminals 122 and 121 of the throttle circuit 120. The D-A converter 110 has its output terminal 112 connected to input terminals 131, 141 and 151 of the respective first-to-second, second-to-third and third-to-fourth gear-shift signal generators 130, 140 and 150 and to an input terminal 192 of the accident detector 190. The throttle circuit 120 has its output terminal 124 connected to input terminals 132, 142 and 152 of the respective first-to-second, second-to-third and third-to-fourth gear-shift signal generators 130, 140 and 150. The first-to-second gear-shift signal generator 130 has output terminals 133 and 134 connected to respective input terminals 161 and 162 of the logic circuit 160. The second-to-third gear-shift signal generator 140 has output terminals 143 and 144 connected to respective input terminals 163 and 164 of the logic circuit 160. The third-to-fourth gear-shift signal generator 150 has output terminals 153 and 154 connected to respective input terminals 165 and 166 of the logic circuit 160. The logic circuit 160 has output terminals 161', 162', 163'and 164' connected to respective input terminals 171, 172, 173 and 174 of the memory 170, whose output terminals 175, 176, 177 and 178 are connected to respective input terminals 181, 182, 183 and 184 of the electromagnetic valve drive 180. The electromagnetic valve drive 180 has output terminals 185, 186, 187 and 188 connected to the respective input terminals 41, 42, 43 and 44 of the electromagnetic valve unit 40. The selecter switch 30 has output terminals 31, 32, 33, 34 and 35, one of which, namely the output terminal 31, is connected to an input terminal 189 of the electromagnetic valve drive 180, other output terminals 32 to 34 of which are connected to respective input terminals 43, 42 and 41 of the electromagnetic valve unit 40, and the remaining output terminal 35 of which is connected to an input terminal 45 of the electromagnetic valve unit 40. The accident detector 190 has its output terminal 193 connected to an input terminal 179 of the memory 170. It is to be understood that power supply and power supply circuit are omitted in the Figure.

Various essential parts of the system above described together with the operation thereof will now be described individually.

The vehicle speed detector 10, which may be attached to a cable outlet provided in the vehicle or mounted within the gear-shifting mechanism of the transmission, generates an output AC voltage at frequencies varying in proportion to the vehicles speed at the output terminal 11.

Figure 4:
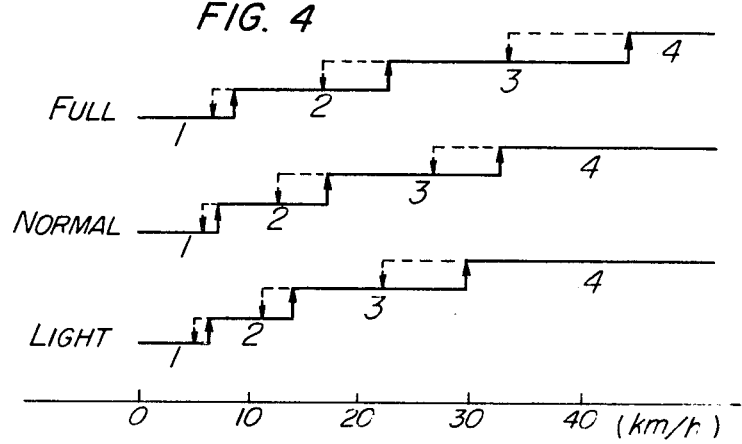
FIG. 4 shows the transmission characteristics of the embodiment of FIG. 1.

The D-A converter 110 may be similar to the converter shown in our prior applications above-mentioned and as in FIG. 4 of the Wakamatsu et al. U.S. Pat. No. 3,507,544 and comprises an amplitude control circuit to control the amplitude of the AC output voltage produced by the vehicle speed detector 10 to a constant value, a smoothing circuit including a delay element having a capacitor, and a differential amplifier circuit. It generates output voltage at levels varying in accordance with the frequency of the AC voltage output of the vehicle speed detector 10 at the output terminal 112 after a predetermined delay time with respect to the input. The delay time is introduced by the afore-said smoothing circuit including a delay element having a capacitor.

Figure 2:
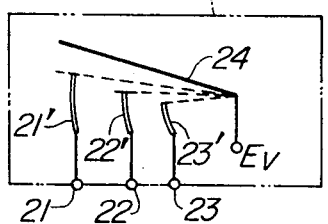
FIG. 2 shows an example of a throttle switch used in the embodiment of FIG. 1.

The throttle switch 20 is of a construction as shown in FIG. 2. It comprises a movable contact 24 coupled to the engine throttle or accelerator pedal and fixed contacts 21', 22' and 23' connected to the output terminals 21, 22 and 23. The movable contact 24 contacts the fixed contacts 21', 22' and 23' successively as the throttle opening progressively increases when the accelerator pedal continues to be depressed; when the engine throttle valve opening is nearly, but not completely, closed, the movable contact 24 touches only the fixed contact 21' (this state is hereinafter referred to as the "light" state), when the engine throttle valve opening is intermediate, the movable contact 24 touches the fixed contacts 21' and 22' (hereinafter referred to as the "normal" state), and when the engine throttle valve opening is at its utmost, the movable contact 24 touches all the fixed contacts 21', 22' and 23' (hereinafter referred to as the "full" state). When the engine throttle valve is completely closed, the movable contact 24 touches none of the fixed contacts 21', 22' and 23' (hereinafter referred to as the "idle" state). To the movable contact 24 is applied a constant voltage $E_v$.

Figure 3:
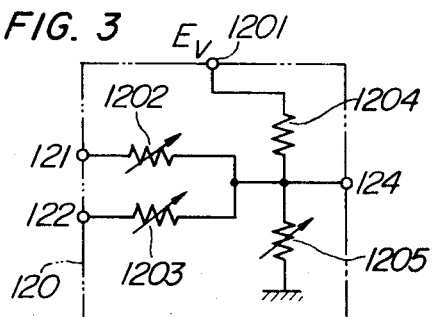
FIG. 3 is a circuit diagram of an example of a throttle circuit used in the embodiment of FIG. 1.

The throttle circuit 120 is of a construction as shown in FIG. 3. It comprises a terminal 1201, on which is applied the voltage $E_v$, a variable resistor 1202 connected between the input terminal 121 and the output terminal 124, a variable resistor 1203 connected between the input terminal 122 and the output terminal 124, a resistor 1204 connected between the terminal 1201 and the output terminal 124, and a variable resistor 1205 connected between the ground and the output terminal 124. In operation, when a signal ($E_v$) is absent at the input terminals 121 and 122, that is, when the throttle switch 20 is in the "light" state, the voltage $E_1$ at the output terminal 124 is:

$$E_1 = R_1/(R+R_1) E_v, \quad (1)$$

where R is the resistance of the resistor 1204 and $R_1$ is the resistance of the variable resistor 1205. When the throttle switch 20 is switched to the "normal" state, as a result of depressing the accelerator pedal a signal ($E_v$) appears at the input terminal 121, and a corresponding voltage $E_2$ at the output terminal 124 becomes:

$$E_3 = R_1/(R_1 + R \parallel R_2) E_v, \quad (2)$$

where $R_2$ is the resistance of the variable resistor 1202, and $R \parallel R_2$ means an equivalent resistance resulting from R and $R_2$ connected in parallel. As the accelerator is fully depressed, the throttle switch 20 is switched into the "full" state, causing a signal ($E_v$) to appear at both the input terminals 121 and 122. The voltage $E_3$ at the output terminal 124 this time is given as:

$$E_3 = R_1/(R_1 + R \parallel R_2 \parallel R_3) E_v, \quad (3)$$

where $R_3$ is the resistance of the resistor 1203, and $R \parallel R_2 \parallel R_3$ means an equivalent resistance resulting from R, $R_2$ and $R_3$ connected in parallel. The voltage at the output terminal 124 thus assumes the successive values $E_1$, $E_2$ and $E_3$ in correspondence to the successively changing "light", "normal" and "full" states of the throttle switch 20.

Figure 6:
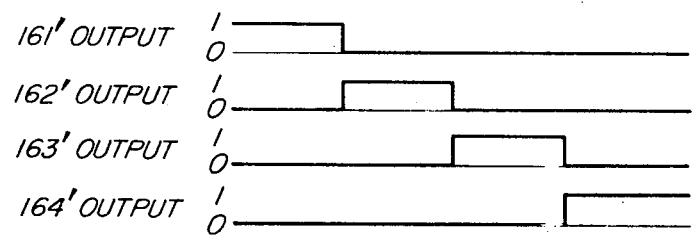
FIG. 6 shows outputs of a logic circuit in the embodiment of FIG. 1.

The first-to-second, second-to-third and third-to-fourth gear-shift signal generators 130, 140 and 150 respectively each of which is constructed as shown in FIG. 6 or 14 of our above-mentioned copending application Ser. No. 53,909 compare the signal (voltage) proportional to the vehicle speed that appears at the D-A converter and the signal (voltage) indicating the throttle state that appears from the throttle circuit 120, and their circuit parameters are preset such that transmission characteristics as shown in FIG. 4 (except for the "idle" state) may be obtained. In FIG. 4, the abscissa represents the vehicle speed (in km/h) and the ordinate represents the "light", "normal" and "full" states of the throttle switch 20. The arrows directed from line segments 1 to segments 2 and vice versa, from segments 2 to 3 and vice versa and from segments 3 to segments 4 and vice versa correspond to respective gear-shifting point for shifting gears from the first into the second and vice versa, from the second into the third and vice versa and from the third into the fourth and vice versa respectively. The roles of causing the gear-shifting from the first into the second and vice versa are taken by the first-to-second gear-shift signal generator 130, the roles of causing the gear-shifting from the second into the third and vice versa are taken by the second-to-third gear-shift signal generator 140, and the roles of causing the gear-shifting from the third into the fourth and vice versa are taken by the third-to-fourth gear-shift signal generator 150. These gear-shift signal generators each comprise a comparator circuit, a feedback circuit and a phase inverter.

Figure 5:
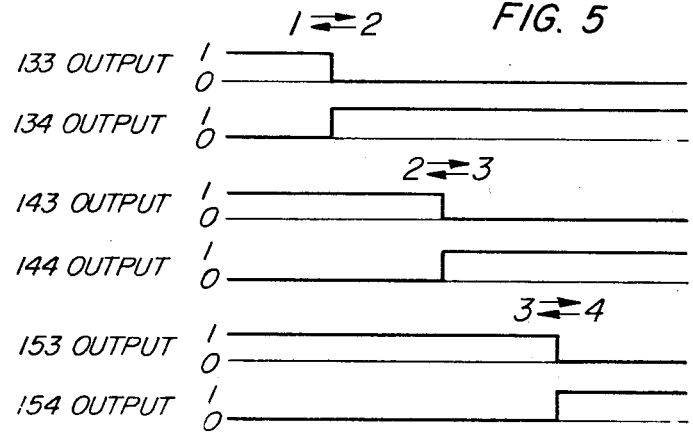
FIG. 5 shows outputs of three gear shift signal generator circuits in the embodiment of FIG. 1.

When the gear-shifting point for shifting from the first into the second speed gear is reached, there does not appear any signal voltage at the output terminal 133 but there does appear a signal voltage at the output terminal 134 of the first-to-second gear-shift signal generator 130 (the presence and absence of the signal voltage are hereinafter expressed by the respective symbolized forms of 1 and 0). On the other hand, when the gearrshifting point for shifting from the second into the first speed gear is reached, the states of the output terminals 133 and 134 are respectively 1 and 0. Similarly, at the second-to-third gear-shifting point the states of the output terminals 143 and 144 of the second-to-third gear-shift signal generator 140 are respectively 0 and 1, and conversely at the third-to-second gear-shifting point the second-to-third gear-shift signal generator 140 comes up with its output terminals 143 and 144 respectively being 1 and 0. At this time, the output terminals 133 and 134 are respectively 0 and 1. Also, at the third-to-fourth gear-shifting point the output terminals 153 and 154 of the third-to-fourth gear-shift signal generator 150 are respectively 0 and 1, and conversely at the fourth-to-third gear-shifting point they are respectively 1 and 0. At this time, the output terminals 133 and 134 are 0, and the output terminals 143 and 144 are 1. The foregoing operation is shown in FIG. 5. In the Figure, 1⇆2, 2⇆3 and 3⇆4 respectively indicate the first-to/from-second, second-to/from-third and third-to/from-fourth gear-shifting points, and the ordinate for each of the output terminals 133, 134, 143, 144, 153 and 154 represents the state of these terminals, with 1 corresponding to the presence of the signal and 0 corresponding to the absence of the signal.

The logic circuit 160 may be similar to the logic circuitry shown in Computer Handbook by Huskey and Korn, First Edition, McGraw Hill Book Company receives the signals from the first-to-second, second-to-third and third-to-fourth gear-shift signal generators 130, 140 and 150 at its input terminals 161 to 166. With the signals as shown in FIG. 5 impressed on the respective input terminals 161 to 166 of the logic circuit 160, the corresponding states of the output terminals 161', 162', 163' and 164' of the logic circuit 160 are as shown in FIG. 6 as a result of the internal circuitry shown in FIG. 1 for logic circuit 160. When the first speed gear is coupled, the output terminal 161' is 1 and the other output terminals 162', 163' and 164' are 0. When the second speed gear is coupled, the output terminal 162' is 1 and the other output terminals 161', 163' and 164' are 0. When the third speed gear is coupled, the output terminal 163' is 1 and the other output terminals 161', 162' and 164' are 0. Finally, when the fourth speed gear is coupled, the output terminal 164' is 1 and the other output terminals 161', 162' and 163' are 0.

Figure 7:
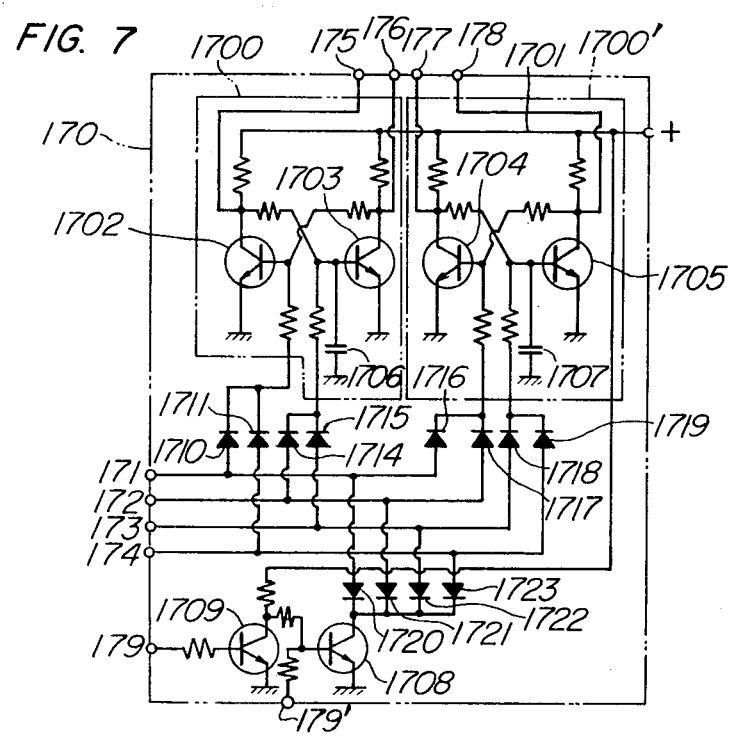
FIG. 7 is a circuit diagram of an example of a memory used in the embodiment of FIG. 1.

The memory 170 is of a construction as shown in FIG. 7. It includes two bistable multi-vibrators 1700 and 1700', which are well known in the art, and which have a common lead to a power supply. The bistable multi-vibrator 1700 has a pair of transistors 1702 and 1703, and the bistable multi-vibrator 1700' also has a pair of transistors 1704 and 1705. These multi-vibrators respectively have capacitors 1706 and 1707 connected to the base of the respective transistors 1703 and 1705, whereby upon impression of a voltage on the lead 1701 only the transistors 1702 and 1704 are triggered and the transistors 1703 and 1705 are not triggered until a certain delay time has passed. The memory also includes a transistor 1708, which has its emitter grounded and its base connected through a resistor to an input terminal 179', a transistor 1709, which has its emitter also grounded, its base connected through a resistor to the input terminal 179 and its collector connected through a resistor to the base of the transistor 1708, diodes 1710 and 1711, which have their negative poles connected through a common resistor to the base of the transistor 1702 and their positive poles connected to the respective input terminals 171 and 174, diodes 1714 and 1715, which have their negative poles connected through a common resistor to the base of the transistor 1703 and their positive poles connected to the respective input terminals 172 and 173, diodes 1716 and 1717, which have their negative poles commonly connected through a resistor to the base of the transistor 1704 and their positive poles connected to the respective input terminals 171 and 172, diodes 1718 and 1719, which have their negative poles commonly connected through a resistor to the base of the transistor 1705 and their positive poles connected to the respective input terminals 173 and 174, and diodes 1720 to 1723, which have their negative poles commonly connected to the collector of the transistor 1708 and their positive poles connected to the respective input terminals 171 to 174. In operation, when a power supply switch (not shown) is turned on, a voltage appears on the lead 1701 to trigger the transistors 1702 and 1704 while leaving the transistors 1703 and 1705 off until a certain time interval is elapsed through the action of the capacitors 1706 and 1707. Subsequently, as the throttle opening increases to render the throttle switch 20 at least into the "light" state, a signal (voltage) is impressed on the input terminal 179 to trigger the transistor 1709 while keeping the transistor 1708 off. If the memory in this state receives the first speed signal, that is, if a signal appears only at the input terminal 171 (the other input terminals 172, 173 and 174 remaining 0), the transistors 1702 and 1703 respectively remain "on" and "off", for the signal voltage is impressed through the diode 1710 on the base of the transistor 1702, and also the transistors 1704 and 1705 respectively remain "on" and "off", for the signal voltage is impressed through the diode 1716 on the base of the transistor 1704. At this time, the output terminals 175 and 177 are 0 and the output terminals 176 and 178 are 1. Next, if the memory receives the second speed signal, at which time the input terminal 171 is switched to 0, the input terminal 172 is switched to 1 and the input terminals 173 and 174 remains 0, the transistor 1703 is triggered to cut off the transistor 1702, for current flows through the diode 1714 to the base of the transistor 1703, while the transistors 1704 and 1705 respectively remain "on" and "off", for current flows through the diode 1717 to the base of the transistor 1704. At this time the output terminals 175 and 178 provide the signal 1 and the output terminals 176 and 177 provide the signal 0. Thirdly, if the memory receives the third speed signal, at which time the input terminals 172 is switched to 0, the input terminal 173 is switched to 1 and the input terminals 171 and 174 remain 0, the transistors 1702 and 1703 respectively remain "off" and "on", for current flows through the diode 1715 to the base of the transistor 1703, while the transistor 1705 is triggered to cut off the transistor 1704, for current flows through the diode 1718 to the base of the transistor 1705. At this time, the output terminals 175 and 177 provide the signal 1 and the output terminals 176 and 178 provide the signal 0. Finally, if the memory receives the fourth speed signal, at which time the input terminal 173 is switched to 0, the input terminal 174 is switched to 1 and the input terminals 171 and 172 remain 0, the transistor 1702 is triggered to cut off the transistor 173, for current flows through the diode 1711 to the base of the transistor 1702 while the transistor 1704 and 1705 respectively remain "off" and "on", for current flows through the diode 1719 to the base of the transistor 1705. At this time, the output terminals 175 and 178 provide the signal 0 and the output terminals 176 and 177 provide the signal 1. The states of the memory terminals just described are tabulated as follows:

STATES OF THE INPUT AND OUTPUT
TERMINALS OF THE MEMORY

| Speed Signal | Input terminals 171, 172, 173 and 174 | Output terminals | | | |
|---|---|---|---|---|---|
| | | 175 | 176 | 177 | 178 |
| First | 1 at terminal 171 and 0 at the rest | 0 | 1 | 0 | 1 |
| Second | 1 at terminal 172 and 0 at the rest | 1 | 0 | 0 | 1 |
| Third | 1 at terminal 173 and 0 at the rest | 1 | 0 | 1 | 0 |
| Fourth | 1 at terminal 174 and 0 at the rest | 0 | 1 | 1 | 0 |

When the vehicle is travelling with the transmission placed, for instance, in the third, the signal 1 is present at the input terminal 173 while the signal 0 is present at the other input terminals of the memory 170, so that the output terminals 175 and 177 are 1 while the output terminals 176 and 178 are 0. In this situation, if the accelerator is released, rendering the throttle switch 20 into the "idle" state, the signal at the input terminal 179 of the memory 170 becomes 0 (volts), thus cutting off the transistor 1709 to trigger the transistor 1708 so as to ground the input terminals 171 to 174 through the respective diodes 1720 to 1723 and the transistor 1708. Thus, the transistors 1702 and 1704 continue to be "off" and the transistors 1703 and 1705 "on", so that the previous state of the output terminals 175 to 178 of the memory 170 is retained irrespective of subsequent change of the signal at the input terminals 171 to 174. It will thus be seen that regardless of the gear position (first, second, third or fourth) of the transmission engine braking may be effected without downshifting the transmission by releasing the accelerator pedal to render the throttle switch 20 into the "idle" state, and by re-pressing the accelerator pedal the signal appears again at the input terminal 179 to trigger the transistor 1709 and hence cut off the transistor 1708, the locked state of the memory is released.

Figure 8:
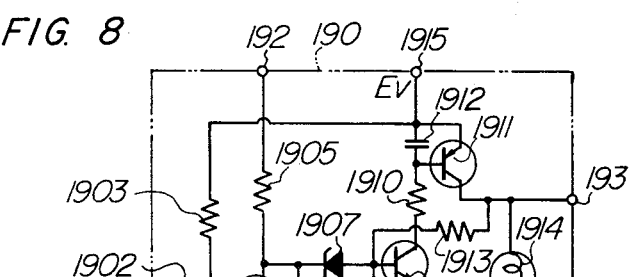
FIG. 8 is a circuit diagram of an example of an accident detector used in the embodiment of FIG. 1.
Figure 9:
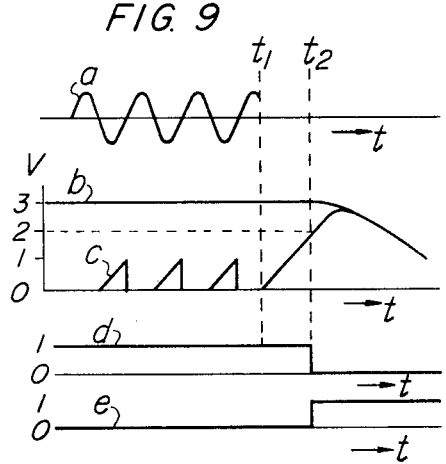
FIG. 9 illustrates the operation of the accident detector of FIG. 8.

The accident detector 190 is of a construction as shown in FIG. 8. It comprises a transistor 1901, a capacitor 1902 inserted between the base of the transistor 1901 and the input terminal 191, bias resistors 1903 and 1904 for the transistor 1901, which are preset such that the transistor 1901 is cut off when the input signal on the input terminal 191 ceases, resistor 1905 connected between the collector of the transistor 1901 and the input terminal 192, a capacitor 1906 inserted between the collector of the transistor 1901 and the earth, a transistor 1909, which has its base connected through a constant-voltage diode 1907 (with a breakdown voltage of 2 volts) to the non-grounded terminal of the capacitor 1906, a resistor 1908, which serves to lead the dark or leakage current through the diode 1907 to the ground and to ensure reliable operation of the transistor 1909, a transistor 1911, which has it base connected through a resistor 1910 to the collector of the transistor 1909, its collector connected through a resistor 1913 to the base of the transistor 1901 and its emitter connected to a power terminal 1915 ($E_v$), a capacitor 1912 connected between the base and emitter of the transistor 1911, and a lamp 1914 visible to the driver and preferably disposed on the dashboard is connected between the collector of the transistor 1911 and the earth. In operation, when the source voltage $E_v$ is applied to the power terminal 1915, the capacitor 1912 is charged to hold the transistor 1911 "off". Also, when the vehicle is parking, no signal is present at the input terminals 191 and 192, so that the transistors 1901 and 1909 are "off". When the vehicle is started, an AC voltage at a frequency proportional to the vehicle is fed from the vehicle speed detector 10 to the input terminal 191, while a DC voltage proportional to the vehicle speed produced by the D-A converter 110 is applied to the input terminal 192; for example when the vehicle is travelling at a speed of 30 km/h, an AC voltage at a frequency corresponding to 30 km/h is fed to the input terminal 191, and a DC voltage of, for instance, 3 volts corresponding to 30 km/h is fed to the input terminal 192. At this time, the transistor 1901 is repeatedly triggered and cut off at a repetition frequency corresponding to the frequency of the AC voltage impressed on the input terminal 191. The mode of operation of the accident detector 190 is shown in FIG. 9. Referring to the FIG. 9, plot $a$ is the waveform of the AC voltage produced by the vehicle speed detector 10 and impressed on the input terminal 191, plot $b$ is the waveform of the DC voltage produced by the AC-DC converter 10 and impressed on the input terminal 192, plot $c$ is the waveform of the terminal voltage across the capacitor 1906, and plots $d$ and $e$ respectively represent the collector voltages on the transistors 1909 and 1911, that is, the voltage appearing at the output terminal 193. The abscissa taken for time $t$ is identical for all the plots. In a situation that the vehicle is travelling at a constant speed of, for instance, 30 km/h, if the AC voltage output from the vehicle speed detector 10 suddenly ceases at time $t_1$ due to an accident such as short-circuit and breaking of a lead inside the AC generator constituting the vehicle speed detector 10 and short-circuit and breaking of the lead to the output terminal thereof, the AC voltage at the input terminal 191 of the accident detector 190 disappears, so that the transistor 1901 begins to be continuously "off". At the same time, the voltage at the input terminal 192, that is, the output voltage produced by the D-A converter 110, starts to gradually decrease from time $t_1$, as indicated at $b$ in FIG. 9. When the transistor 1901 is cut off at time $t_1$, the terminal voltage across the capacitor 1906 is rapidly built up in accordance with a time constant determined by the capacitance of the capacitor 1906 and the resistance of the resistor 1905, as indicated at $c$. As the terminal voltage across the capacitor 1906 increases up to nearly 3 volts, the constant-voltage diode 1907, whose breakdown voltage is 2 volts, starts to permit reverse current at time $t_2$, at which the terminal voltage across the capacitor exceeds 2 volts, to pass to the base of the transistor 1909, thus triggering the transistor 1909 to trigger the transistor 1911 at time $t_2$. When the transistor 1911 is once triggered, part of its collector current flows through the resistor 1913 into the base of the transistor 1909, so that the conduction state of the transistors 1909 and 1911 continues to be self-sustained. Upon triggering of the transistor 1911, an output voltage appears at the output terminal 193, and at the same time the lamp 1914 is turned on to inform the driver that an accident has occurred in the vehicle speed detector 10. Also, the output signal appearing at the output terminal 193 is impressed on the input terminal 179' of the memory 170 to trigger the transistor 1708 thereof prior to the appearance of the corresponding output signal from either first-to-second gear-shift signal generator 130 or second-to-third gear-shift signal generator 140 by virtue of the time delay introduced by the delay element of the D-A converter 110. When the transistor 1708 is thus triggered, the input terminals 171 to 174 of the memory 170 are grounded through the respective diodes 1720 to 1723 and the transistor 1708 in the same manner as when the throttle switch 20 is rendered into the "idle" state as is described earlier, so that the persisting states of the output terminals of the memory are retained irrespective of the subsequent state of the input terminals 171 to 174, maintaining the position of the transmission just before the occurrence of the accident. Thus, sudden downshifting of the transmission into the first speed gear position to suddenly bring about engine braking, which would otherwise occur due to an accident in the vehicle speed detector 10, and the resultant shock may be prevented.

Figure 10:
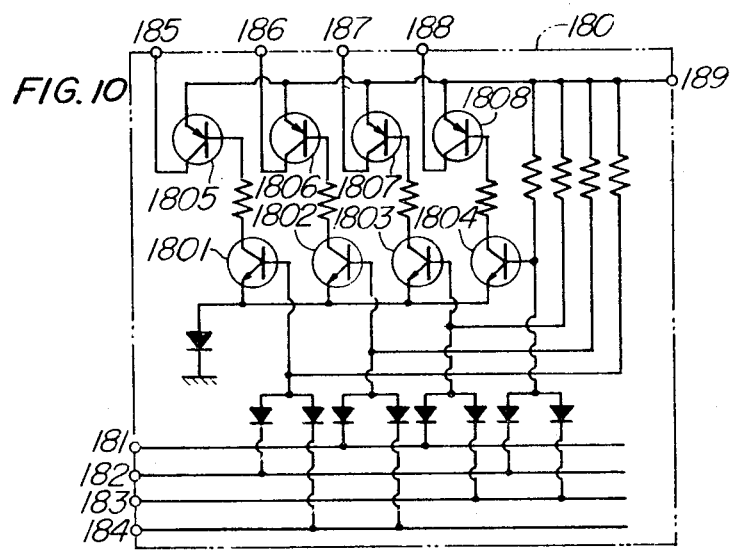
FIG. 10 is a circuit diagram of an example of an electromagnetic valve drive used in the embodiment of FIG. 1.

The electromagnetic valve drive 180 is of a construction as shown in FIG. 10. It comprises an AND circuit including transistor 1801 to 1804 and a power circuit including transistors 1805 to 1808. In operation, if the signal 1 is present at the input terminals 182 and 184 and the signal 0 is present at the input terminals 181 and 183, only the transistor 1801 is "on" and the rest of the transistors of the AND circuit are "off". If the signal 1 is present at the input terminals 181 and 184 and the signal 0 is present at the input terminals 182 and 183, only the transistor 1802 is "on" and the rest of the transistors are "off". If the signal 1 is present at the input terminals 181 and 183 and the signal 0 is present at the input terminals 182 and 184, only the transistor 183 is "on" and the rest of the transistors are "off". If the signal 1 is present at the input terminals 182 and 183 and the signal 0 is present at the input terminals 181 and 184, only the transistor 1804 is "on" and the rest of the transistors are "off". When any one of the transistors 1801 to 1804 in the AND circuit becomes "on", the corresponding one of the transistors 1805 to 1808 in the power circuit is triggered to supply power to the corresponding one of the output terminals 185 to 188.

The electromagnetic valve unit 40 is like the similar unit 40 in each of our above mentioned applications and has four electromagnetically operated, on-off valves, namely first-speed, second-speed, third-speed and fourth-speed electromagnetic valves having respective solenoids, which are individually energized by power from the respective output terminals 185 to 188 of the electromagnetic valve drive 180.

The selector switch 30 like the similar switch 30 in each of our aforesaid applications and comprises five fixed contacts and a movable contact linked to a lever. By placing the lever in the "Automatic" position, an output voltage is fed from the output terminal 31 of the selector switch 30 to the input terminal 189 of the electromagnetic valve drive 180 to render the electromagnetic valve drive 180 operative. This sets up the state for the automatic transmission. The manual shifting may be accomplished, independently of the automatic transmission control system, by placing the lever in any one of the "First", "Second", "Third" and "Reverse" positions, whereupon a voltage is produced at a corresponding one of the output terminals 34, 33, 32 and 35 to energize a corresponding one of the solenoids of the respective first-speed, second-speed, third-speed and reverse-speed electromagnetic valves of the electromagnetic valve unit 40. Thus, the transmission is placed in the corresponding gear position.

It is assumed in the foregoing description of the preferred embodiment that the accident detector 190 generates an output signal when it detects the interruption of the output signal of the vehicle speed detector due to an accident so long as the vehicle is travelling at a speed above the predetermined constant speed of 30 km/h. The constant vehicle speed is by no means limited to the above value of 30 km/h but it may be suitably predetermined by appropriately selecting the values of breakdown voltage of the constant-voltage diode, resistance of the resistor 1905, capacitance of the capacitor 1906 and other relevant circuit parameters of the accident detector 190.

Also, in place of the AC generator used for the vehicle speed detector 10 in the foregoing embodiment, a pulse generator and a frequency generator may as well be used for the vehicle speed detector 10 to obtain an output signal at a frequency proportional to the vehicle speed detected. Further, though the above embodiment uses a load detecting circuit comprising the throttle switch 20 and the throttle circuit 120 for obtaining a voltage corresponding to the throttle opening, such load detecting circuit may be replaced with the one that provides an electric signal corresponding to the engine intake negative pressure, which varies in accordance with the throttle opening as is conventional, for example, in U.S. Pat. Nos. 3,272,187 and 3,566,846.

What is claimed is:

1. A control system for an automatic transmission having a plurality of gear shifting mechanisms and being usable in a vehicle having a movable accelerator, comprising:

vehicle speed detector means for producing a digital signal having pulses whose number per unit time is proportional to the speed of said vehicle;

converter means operatively connected to said speed detector means for converting said digital signal to an analog signal having magnitude proportional to the number of pulses per unit time of said digital signal, said converter means including means for delaying said analog signal by a predetermined time interval;

a throttle switch adaptable to cooperate with said accelerator and having a plurality of contacts successively operable in accordance with the amount of movement of said accelerator;

throttle circuit means connected to said throttle switch for producing a voltage signal whose value varies depending on the operation of said contacts of said throttle switch;

accident detector means connected to receive said digital signal of said speed detector means and said delayed analog signal of said converter means for producing a signal when said digital signal ceases while said delayed analog signal having a value larger than a predetermined value is received thereto;

a plurality of gear-shift signal generator circuit means, each connected to said converter means and said throttle circuit means, for producing different speed change signals in accordance with respective predetermined transmission characteristics depending on the magnitude of said delayed analog signal of said converter means relative to the value of said voltage signal of said throttle circuit means;

logic circuit means connected to said plurality of gear-shift signal generator means for producing one of different gear-shift signals which is logically determined from said different speed change signals;

memory means connected to said logic circuit means and said accident detector means for memorizing an output which changes in accordance with the change of the gear-shift signal derived from said logic circuit means with no signal from said accident detector means, and which is retained irrespective of the change of said gear-shift signal at the presence of the signal derived from said accident detector means;

and means including an electromagnetic valve unit for controlling the operation of said gear shifting mechanisms in accordance with the output memorized in said memory.

2. A control system according to claim 1, wherein said converter means comprises an amplitude regulating circuit to regulate the amplitude of the pulses of said digital signal derived from said vehicle speed detector to a predetermined level, and the means for delaying said analog signal includes a capacitor circuit.

3. A control system according to claim 1, wherein said memory means comprises an input circuit connected to said logic circuit means for receiving said different gear-shift signals, bistable multivibrator means connected to said input circuit for producing said output corresponding to said gear-shift signals, and a circuit connected to said input circuit for bypassing said different gear-shift signals at the presence of said signal derived from said accident detector thereby preventing said signals from being applied to said bistable multivibrator means.

4. An automatic transmission control system for use in an automatic transmission on vehicles having an engine, an engine throttle, and a plurality of gear ratio drives which comprises:

first means for generating an a-c voltage at a frequency proportional to the speed of the vehicle, a first circuit connected to said means for generating a variable d-c voltage proportional to said frequency, at a predetermined time interval after receiving the corresponding a-c voltage, a second circuit connected to the engine throttle for generating a variable d-c voltage corresponding to the opening of said throttle, a third circuit having two inputs each connected to said first circuit and said second circuit and generating a signal when the aforesaid two variable d-c voltages attain a predetermined relationship, a fourth circuit connected to said third circuit for generating an output signal corresponding to a signal generated by said third circuit and holding said output signal until another signal which is different from the signal formerly generated by said third circuit appears, said fourth circuit including a fifth circuit having a terminal for holding the output signal of said fourth circuit regardless of the input signal from said third circuit when a signal is applied to said terminal, said terminal being connected to said second circuit thereby to hold the output signal of said fourth signal when the d-c voltage of said second circuit does not reach a predetermined value, second means connected to said terminal for applying the signal to said terminal when the output signal of said first means does not appear and the output signal of said first circuit reaches a predetermined value, and pressure third means having an input connected to said fourth circuit and including a gear shifting mechanism for accomplishing a selective gear ratio drive in response to the signal of said fourth circuit.

5. A control system for an automatic transmission having a plurality of gear shifting mechanisms and being usable in a vehicle, comprising:

vehicle speed detector means for producing an output signal proportional to the speed of said vehicle, means operatively connected to said detector means for delaying said signal a predetermined time, accident detector means connected to said detector and delaying means for producing a signal indicating an accident when said output signal from the detector means ceases while said delayed signal continues to issue from said delaying means at a value above a predetermined value, gear-shift signal generator circuit means connected to said delaying means for producing different speed change signals in accordance with predetermined transmission characteristics depending on the values of at least said delayed signal, memory means connected to said gear-shift signal generator means and said accident detector means for memorizing an output which changes in accordance with said speed change signals while said accident detector means produces no said accident indicating signal, but which output is maintained when said accident signal occurs even if there is a change in said speed change signals, and means connected to said memory means for controlling the operation of said gear shifting mechanisms in accordance with the said memorized output of said memory means.

6. A control system for an automatic transmission having a plurality of gear shifting mechanisms and being usable in a vehicle, comprising:

vehicle speed detector means for producing an output signal proportional to the speed of said vehicle, means operatively connected to said detector means for delaying said signal a predetermined time, accident detector means connected to said detector and delaying means for producing a signal indicating an accident when said output signal from the detector means ceases while said delayed signal continues to issue from said delaying means at a value above a predetermined value, means for producing a signal corresponding to the load on said engine, gear-shift signal generator circuit means connected to said load signal producing means and to said delaying means for producing different speed change signals in accordance with predetermined transmission characteristics depending on the relative values of said delayed signal and said load signal, memory means connected to said gear-shift signal generator means and said accident detector means for memorizing an output which changes in accordance with said speed change signals while said accident detector means produces no said accident indicating signal, but which output is maintained when said accident signal occurs even if there is a change in said speed change signals, and means connected to said memory means for controlling the operation of said gear shifting mechanisms in accordance with the said memorized output of said memory means.

* * * * *